United States Patent [19]

Zhang

[11] Patent Number: 5,832,897
[45] Date of Patent: Nov. 10, 1998

[54] METHOD AND ARRANGEMENT FOR CONTROLLING AN INTERNAL COMBUSTION ENGINE

[75] Inventor: Hong Zhang, Regensburg, Germany

[73] Assignee: Robert Bosch GmbH, Stuttgart, Germany

[21] Appl. No.: 875,693

[22] PCT Filed: Jul. 20, 1996

[86] PCT No.: PCT/DE96/01333

§ 371 Date: Aug. 1, 1997

§ 102(e) Date: Aug. 1, 1997

[87] PCT Pub. No.: WO97/21029

PCT Pub. Date: Jun. 12, 1997

[30] Foreign Application Priority Data

Dec. 5, 1995 [DE] Germany .................. 195 45 221.6

[51] Int. Cl.$^6$ .................................................. F02D 31/00
[52] U.S. Cl. ............................ 123/352; 123/25; 123/89
[58] Field of Search .................... 123/352, 425, 123/489

[56] References Cited

U.S. PATENT DOCUMENTS

| | | | |
|---|---|---|---|
| 4,856,465 | 8/1989 | Denz et al. | 123/90.17 |
| 5,115,782 | 5/1992 | Klinke et al. | 123/489 |
| 5,183,020 | 2/1993 | Hosoi | 123/466 |
| 5,284,116 | 2/1994 | Richeson et al. | 123/425 |
| 5,558,178 | 9/1996 | Hess et al. | 180/197 |

FOREIGN PATENT DOCUMENTS

| | | |
|---|---|---|
| 0542562 | 5/1993 | European Pat. Off. . |
| 3341622 | 5/1984 | Germany . |
| 4141947 | 6/1993 | Germany . |
| 63097873 | 4/1988 | Japan . |
| 2271198 | 4/1994 | United Kingdom . |
| WO 95/24550 | 9/1995 | WIPO ................................ 123/352 |

OTHER PUBLICATIONS

"Automotive Handbook", Bosch, 3rd Edition, pp. 470 and 471.
Patent Abstracts of Japan, vol. 12, No. 336 (M–739), Sep. 1988.

Primary Examiner—Raymond A. Nelli
Attorney, Agent, or Firm—Walter Ottesen

[57] ABSTRACT

The invention is directed to a method for controlling an internal combustion engine having a control unit for detecting various operating variables of the engine including engine rpm (Nmot) and engine load (TL) and for generating control variables. The engine has an optimal ignition angle (Zwopt) at which the engine operates at highest efficiency. A value for an optimal torque (Mopt) of the engine is determined in a first characteristic field in dependence upon the engine rpm (Nmot) and engine load (TL). The optimal ignition angle (Zwopt) is determined from a second characteristic field on the basis of the engine rpm (Nmot) and the engine load (TL). A corrective value (dZWTKM) from a third characteristic field is determined in dependence upon the engine temperature (Tmot) and the intake air temperature (Tans). The optimal ignition angle (Zopt) is coupled with the corrective value (dZWTKM) to form a corrected optimal ignition angle (Zopt). A deviation of the actual ignition angle adjustment (ZW) is formed from said optimal ignition angle (Zwopt) and a corrective value (MZW) is determined for the optimal torque (Mopt) in dependence upon the deviation of the optimal ignition angle (Zwopt) and the actual ignition angle setting in a characteristic line. The optimal torque value (Mopt) is logically coupled with the corrective value (MZW) to form the actual torque value (Mindact) and the actual torque value is processed to control the engine.

12 Claims, 6 Drawing Sheets

METHOD AND ARRANGEMENT FOR CONTROLLING AN INTERNAL COMBUSTION ENGINE

FIELD OF THE INVENTION

The invention relates to a method and an arrangement for controlling an internal combustion engine according to the preambles of the independent claims.

SUMMARY OF THE INVENTION

In order to control a drive unit, such as an internal combustion engine, it is known from U.S. Pat. No. 5,558,178 to convert a desired value for a torque of the drive unit into a correction of the ignition angle, into suppressing individual cylinders or into metering fuel to individual cylinders and/or into influencing the air supply to the engine. Furthermore, it is known from U.S. Pat. No. 5,692,471 to influence additionally the air/fuel ratio to realize the pregiven torque value. Furthermore, in the known solutions, the actual engine torque is computed while considering the actual engine adjustment (with respect to charge, fuel metering and ignition angle). Engine rpm, engine load and, if required, the exhaust-gas composition are applied. Further variables, which can influence the efficiency of the engine, such as the temperature of the supplied air/fuel mixture in advance of ignition and/or the rate of the exhaust-gas quantity returned into the combustion chamber, are not considered. The computed actual torque is considered for converting the required engine torque into the ignition angle shift, fuel intervention and air intervention. For this reason, the known procedure can be too imprecise in some applications when setting the motor torque and/or computing the actual torque (which is also made available to other control units, for example, a drive slip control or a transmission control).

SUMMARY OF THE INVENTION

It is therefore an object of the invention to improve the precision of the known solutions.

From EP 112 494 A1 (U.S. Pat. No. 4,856,465), it is known to control the overlap times of the inlet and outlet valves of the cylinders of an internal combustion engine. The valve overlap times are adjusted via a shift of the camshaft with the shift being dependent upon engine rpm and engine load.

An exhaust-gas return system is known from "Bosch, Kraftfahrtechnisches Taschenbuch", 21st edition, 1991, pages 470 and 471. In this system, a pregiven exhaust-gas quantity is returned into the intake system of the engine downstream of the throttle flap by driving a control valve via an additional line. This external exhaust-gas return is to be distinguished from the above-mentioned internal exhaust-gas return with overlapping of the opening times of the inlet and outlet valves for which, likewise, certain exhaust-gas quantities are returned into the combustion chamber.

The accuracy with respect to the conversion of the desired engine torque into the control variables of the engine is improved by considering additional variables which influence the efficiency and therefore the engine torque generation of the engine, such as mixture temperature in advance of ignition and/or the rate of exhaust-gas return (internal as well as external).

Furthermore, a more precise torque computation is made available also for other control apparatus.

It is especially advantageous to consider, as additional variables, the mixture temperature in advance of ignition and/or the exhaust-gas return rate because these variables have a considerable influence on the efficiency and therefore on the torque of the engine.

It is further advantageous that the additional variables are included at a central location of the torque computation and torque conversion, namely, when determining the optimal ignition angle, that is, the ignition angle at which the engine develops its greatest efficiency. In this way, the optimization can be carried out by correcting a variable.

BRIEF DESCRIPTION OF THE DRAWINGS

The invention will be described in greater detail with respect to the embodiments shown in the drawing.

DESCRIPTION OF THE PREFERRED EMBODIMENTS OF THE INVENTION

Figure 1:
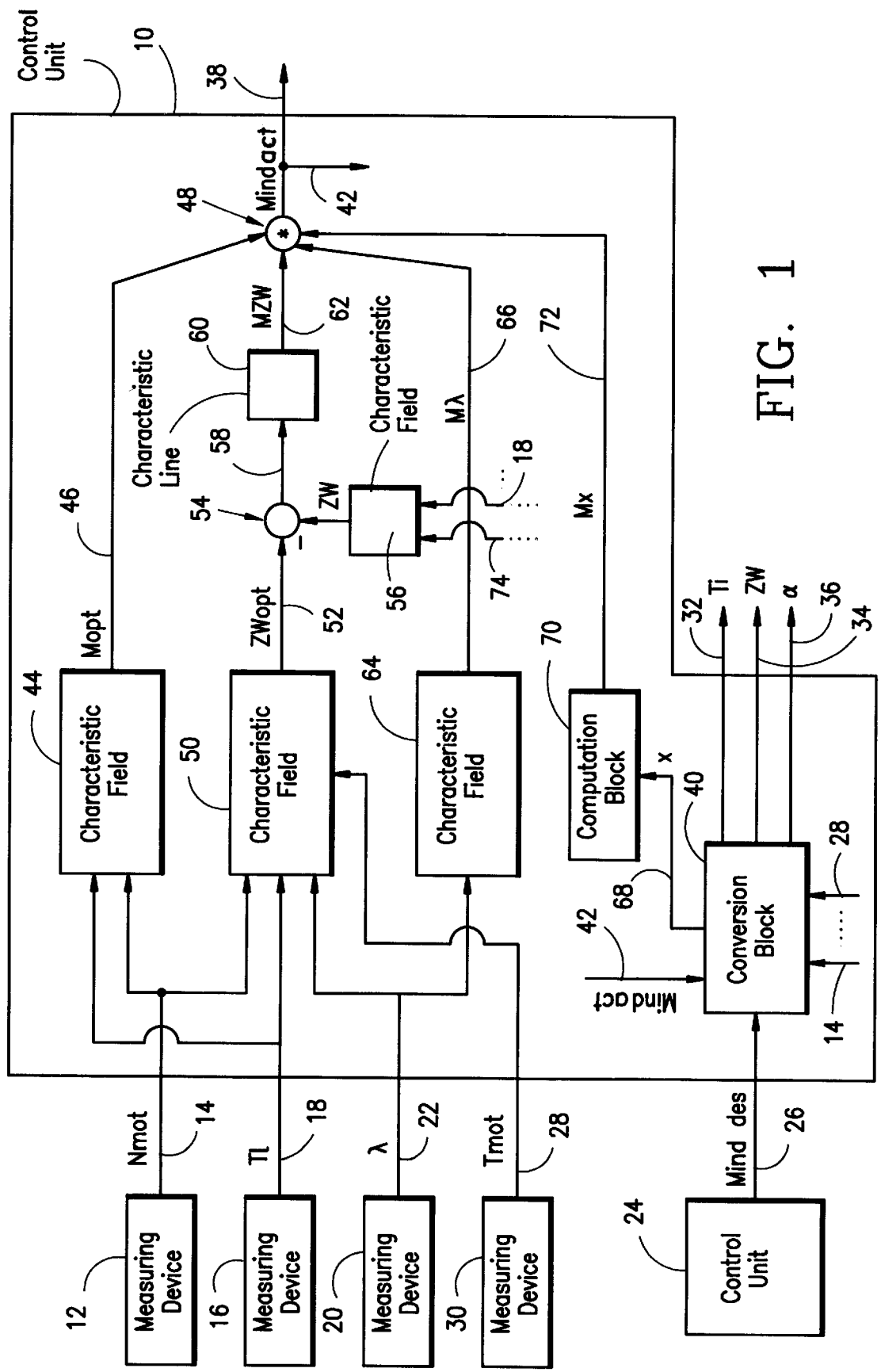
FIG. 1 shows the basic structure of a control system for an internal combustion engine wherein a desired torque value is converted into control variables for the metering of fuel, the ignition angle, the air supply and/or the mixture composition and/or an actual value for the torque of the engine is determined from operating variables.

FIG. 1 shows the basic structure of a control system with respect to an overview block circuit diagram. In this system, a desired torque value is converted into control variables for an internal combustion engine and/or the torque of the engine is determined on the basis of operating variables of the engine. The block circuit diagram is selected for reasons of clarity. In a preferred embodiment, the blocks shown in the control unit are executed as a subprogram or as a program element.

The following are connected to the control unit 10: an input line 14 from a measuring unit 12 for detecting the engine rpm Nmot; a line 18 from a measuring device 16 for the engine load (air quantity, air mass, intake pipe pressure TL); and, an input line 22 from a measuring device 20 for detecting the exhaust-gas composition $\lambda$. In addition, in a preferred embodiment, a line 26 is supplied from a further control unit 24 for determining the desired torque Mdes. Furthermore, at least one additional input line 28 is provided which originates from a measuring device 30 for detecting the engine temperature Tmot. Not shown are the input lines from the measuring devices for detecting the intake air temperature Tans, which is provided in the context of a preferred embodiment and of additional operating variables such as vehicle road speed, cam shaft position, et cetera, which are necessary for controlling the engine. The control unit 10 influences the control variables of the engine via the output lines 32, 34 and 36. These control variables are the fuel quantity Ti to be injected, the ignition angle ZW to be adjusted and/or the air supply $\alpha$ to be adjusted. In addition, and in a preferred embodiment, the computed actual torque value Mact is outputted to other control units via the output line 38.

It is understood that the control unit 10 has, in addition to the elements shown in the FIG. 1, at least means for determining the fuel quantity to be injected, the ignition angle to be adjusted and/or the air supply to be adjusted. Likewise, and if required, methods for controlling the cam shaft and/or the exhaust-gas return in accordance with the initially-mentioned state of the art can be part of the control unit 10.

The procedure known from the state of the art is utilized (taken together symbolically as block 40) for converting the desired value, which is supplied via line 26, into the control variables of the engine. The required operating variables are supplied via the input lines 14 to 28 and the computed actual torque Mact is supplied via a line 42. According to the procedure known from the state of the art, the desired torque value is converted, on the basis of the supplied variables, into the following: a correction for adjusting the air supply α, a correction of the ignition angle ZW to be adjusted, a correction for the mixture composition λ and/or into a pregiven number X of cylinders to which the injection is interrupted. These computed control variables are adjusted via the output lines of the control unit 10.

To determine the actual torque value, the path known from the state of the art is followed. The engine rpm and the engine load are supplied to a first characteristic field 44 via the lines 14 and 18. In this first characteristic field 44, the optimal combustion torque Mopt is determined. The optimal combustion torque is the engine torque, which is determined on the basis of the measured values of rpm and load. This determined engine torque occurs for an optimal ignition angle, that is, for maximum efficiency. The computed torque value is conducted via line 46 to the logic element 48. Correspondingly, the optimal ignition angle ZWopt is determined in the characteristic field 50 from engine rpm and engine load as well as from the exhaust-gas composition which is supplied via line 22. That is, the optimal ignition angle is that ignition angle, when adjusted, at which the engine operates at maximum efficiency. This angle is logically coupled via line 52 in a logic element 54 with the ignition angle zw without additional intervention. This angle is formed primarily on the basis of the operating variables in the characteristic field 56. These operating variables are supplied via lines 14 and 18. The ignition angle defines that ignition angle which is adjusted at the actual operating point without additional interventions being considered such as the correction for realizing the desired torque. The difference between optimal ignition angle and this characteristic field ignition angle is supplied to the efficiency characteristic line 60 via the line 58. The efficiency characteristic line 60 converts the difference into a corrected torque value MZW. This value is supplied via the line 62 to the logic element 48.

Furthermore, a characteristic line 64 is provided to which the line 22 is connected and which converts the deviation of the exhaust-gas composition from the stoichiometric value into a torque corrective value Mλ. This torque corrective value Mλ is supplied via the line 66 to the logic element 48.

Furthermore, information is present in the computation block 40 as to the number X of the suppressed cylinders. This information is supplied via the line 68 to a computation block 70. This computation block forms a torque corrective value MX on the basis of the suppressed cylinders in accordance with the percentage torque reduction via suppression (1−X/Z having X number of suppressed cylinders, Z total number). The torque corrective value MX is supplied via the line 72 to the logic element 48. The actual torque Mact is formed via multiplication of the optimal engine torque and the ignition angle value, mixture composition value and the suppression corrective value. This actual torque Mact is supplied via the line 38 to the outside or via the line 42 to the computation block 40.

If the engine is driven exclusively with a stoichiometric mixture, the consideration of the exhaust-gas composition can be omitted.

In summary, the actual engine torque is given by the following equation:

$$Mact = Mopt[Nmot, Tl]*MZW[zwopt-zw]*M\lambda[1/\lambda]*MX(1-X/Z) \quad (1)$$

Whereas the optimal combustion torque Mopt is dependent upon rpm, load and, if required, on the mixture composition, the optimal ignition angle is not only dependent upon these variables; instead, it is also dependent upon additional variables, which influence the shift of the optimal ignition angle, such as the mixture temperature at the end of the internal and/or external exhaust-gas return rate. This dependency is symbolized in FIG. 1 with the example of the engine temperature via the line 28 and is explained in greater detail in FIGS. 2 to 6.

It has been shown that the mixture temperature is a function of the intake air temperature when entering into the cylinder and the combustion chamber wall temperature. The combustion chamber wall temperature can be estimated from the engine temperature. The temperature of the intake air when entering into the cylinder is, in turn, dependent upon the intake air temperature close to the throttle flap and the engine temperature. That is, the mixture temperature can be described by engine temperature and intake-air temperature. Therefore, and according to the invention, engine temperature and intake-air temperature are considered for improving the accuracy of the determination of the torque or the conversion of the desired torque in that the optimal ignition angle is correspondingly corrected.

The dependency of the optimal ignition angle on the mixture temperature TGM results in accordance with the following equation:

$$ZWopt = ZWopt(N, TL) + dZW\lambda(1/\lambda) + dZWTGM(Tmot, Tans) \quad (2)$$

(dZWλ corrective value by deviation of the mixture composition from the stoichiometric value; dZWTGM corrective value via estimated mixture temperature).

Figure 2:
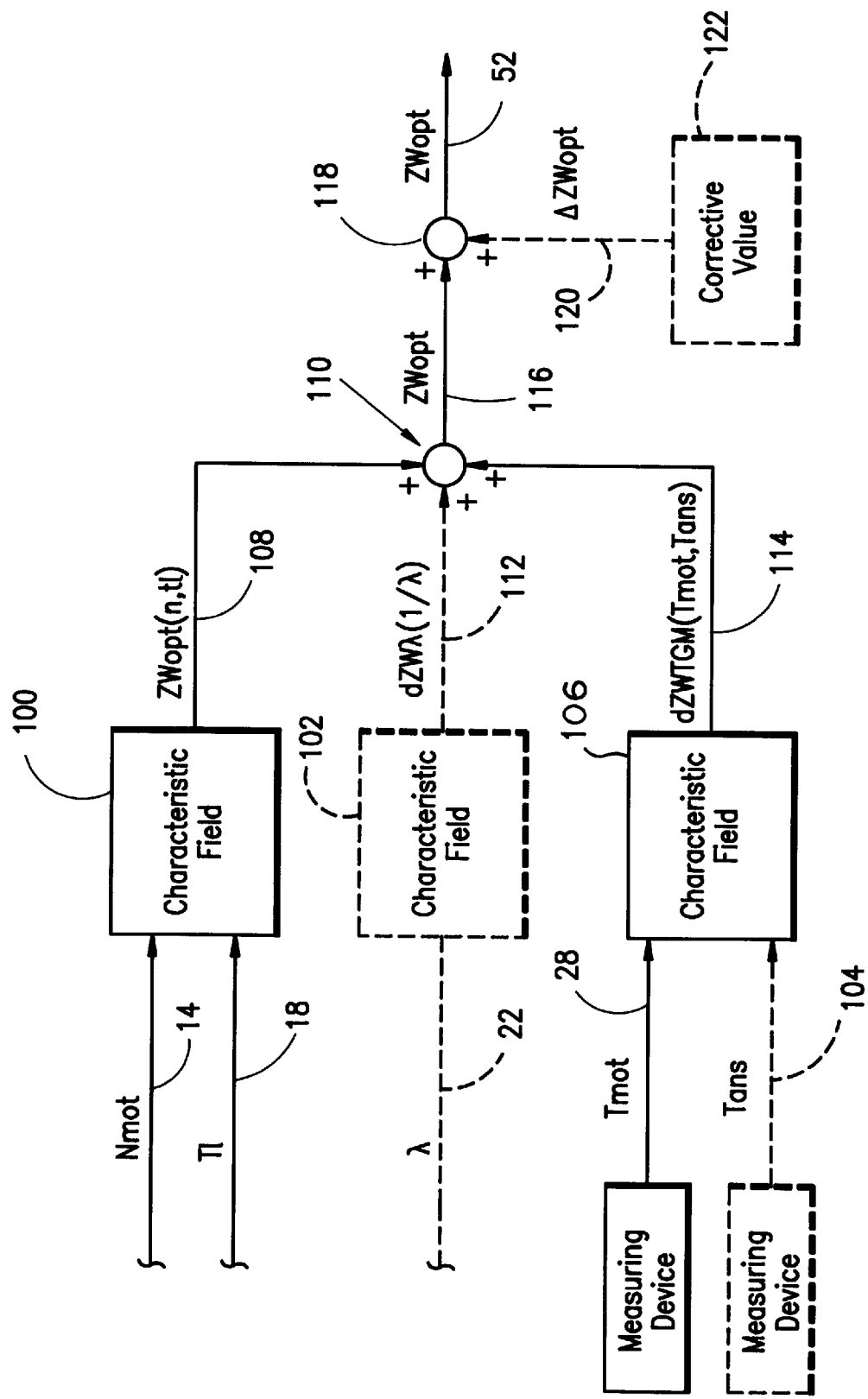
FIG. 2 shows a first embodiment considering the mixture temperature when determining the torque or when converting the desired torque.

The computation of the optimal ignition angle in accordance with equation (2) is shown in FIG. 2. In the first characteristic field 100, the optimal ignition angle is determined from the engine rpm and engine load in dependence upon these variables (rpm and load). In characteristic field 102, the corrective value dZWλ is determined in dependence upon the opposite value of the exhaust-gas composition in order to consider the efficiency change caused by the deviation from the stoichiometric mixture. Furthermore, a measure for the engine temperature is supplied via line 28 and a measure for the intake air temperature Tans is supplied via the line 104. These are converted in the characteristic field 106 into the corrective value dZWTGM which considers the efficiency change caused by the mixture temperature. The determined variables are supplied via lines 108, 112 and 114 to the logic element 110. In logic element 110, the three values are added to the optimal ignition angle ZWopt which is outputted via a line 116.

In the preferred embodiment, the effects of the internal and/or external exhaust-gas return are considered in addition to the mixture temperature dependency of the optimal ignition angle. For this purpose, the line 116 leads to a logic element 118 in which a further corrective value ΔZWopt is added to the optimal ignition angle value. The formation of the ignition angle corrective value(s) is described in greater detail in FIGS. 3 and 4. The output line of the logic element 118 is defined by line 52 via which the optimal ignition angle ZWopt is applied to the additional computations.

The mixture-temperature dependency of the optimal ignition angle can, as a first approximation, only be described via the engine temperature so that the mixture-temperature corrective value dZWTGM is formed in an advantageous embodiment even from a characteristic line dependent upon engine temperature.

Figure 3:
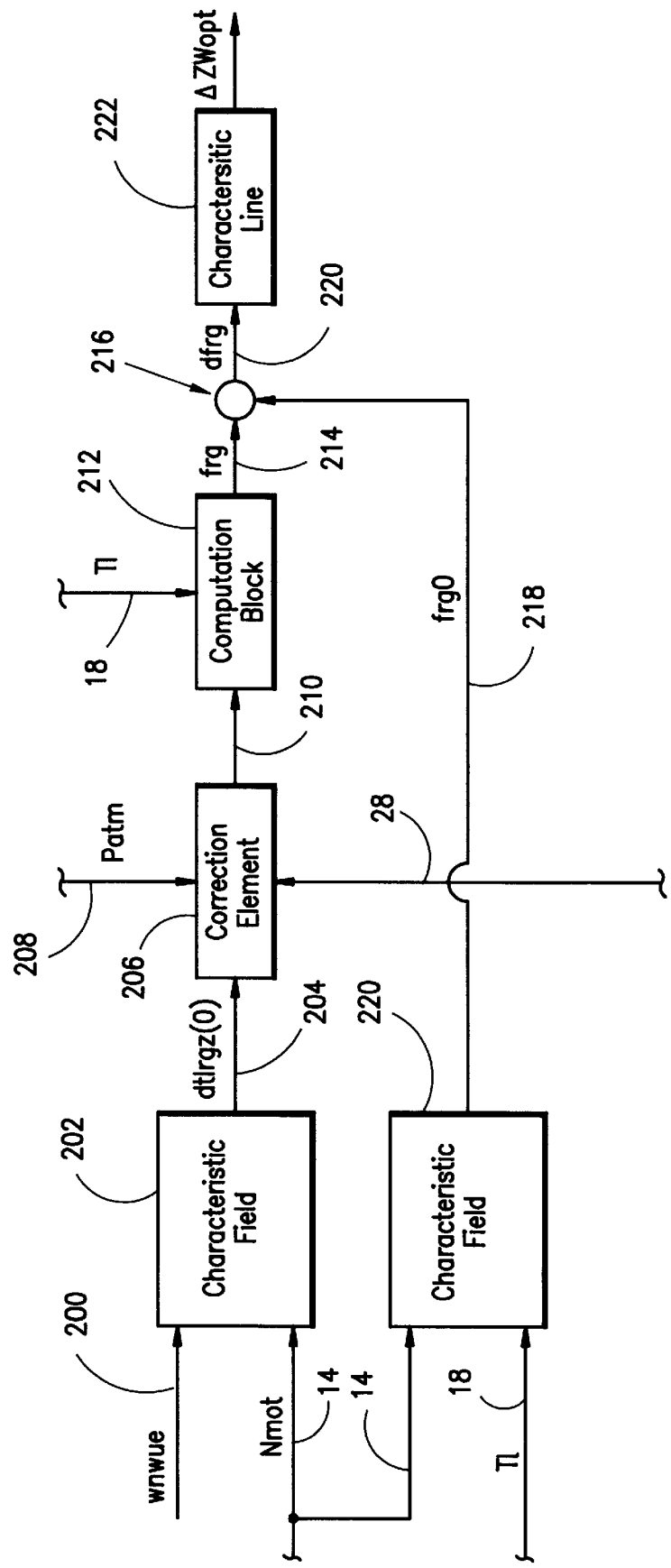
FIG. 3 shows the consideration of the internal exhaust-gas return as supplementary or alternatively to the solution of FIG. 2 in this first embodiment; whereas, in FIG. 4, the consideration of the external exhaust-gas return is shown.
Figure 4:
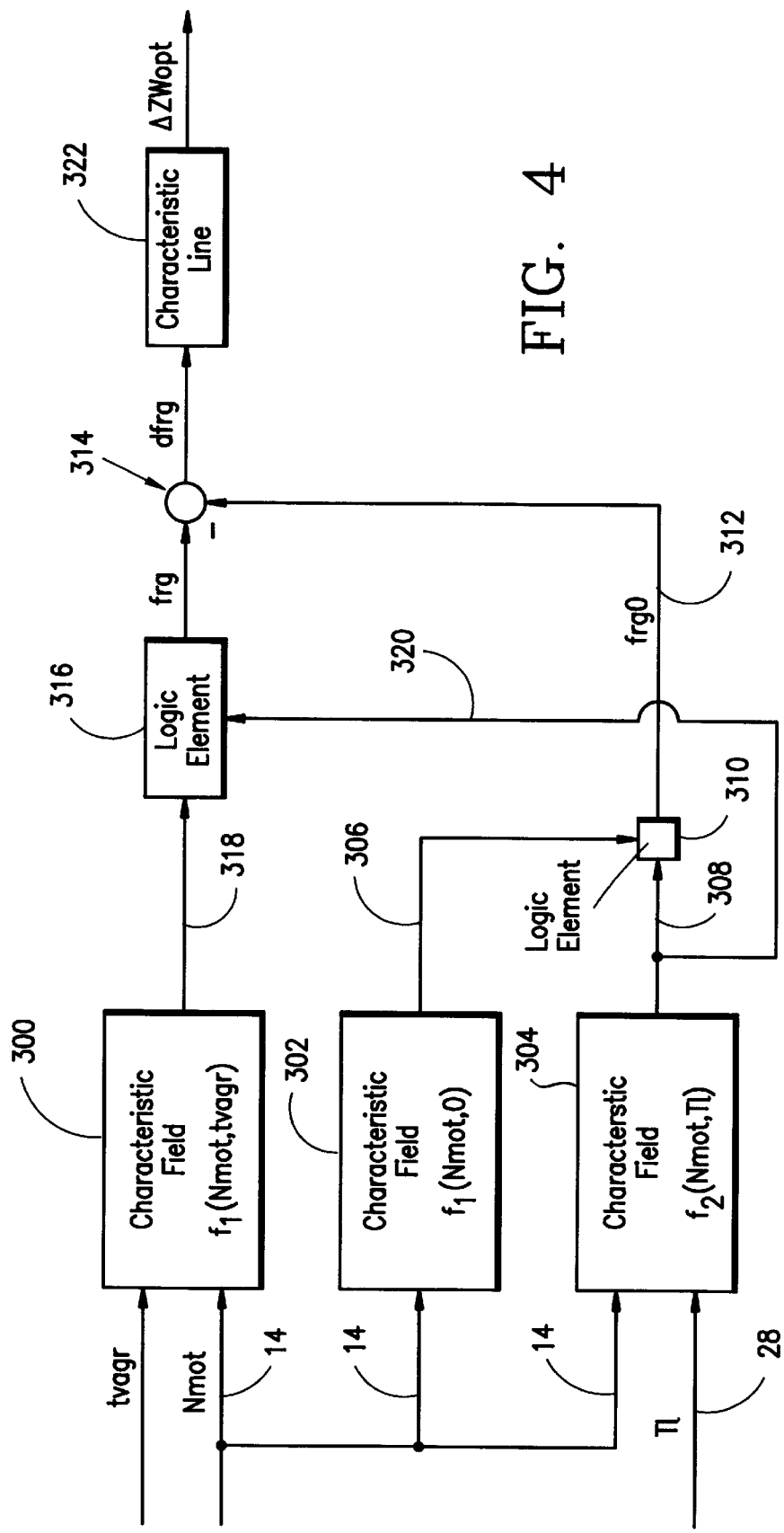

In FIG. 3, the correction of the optimal ignition angle is described first as dependent upon the internal exhaust-gas return. From the state of the art, it is known that the camshaft is controlled such that a predetermined overlap angle results. This signal is present at the control unit 10 from the camshaft control. The occurring overlap angle wnwue which adjusts is supplied via a line 200 to a characteristic field 202. The engine rpm is supplied to the characteristic field 202 via the line 14. This experimentally determined characteristic field determines, from the two supplied variables, the exhaust-gas mass dtlrgz(0) which flows out of the exhaust-gas system into the cylinder when the overlap angle is present and for a specific ambient pressure (that is, atmospheric pressure) and a specific engine temperature. This exhaust-gas mass is supplied via a line 204 to the correction element 206 where a correction of the exhaust-gas mass is carried out in dependence upon atmospheric pressure patm and engine rpm Nmot which are supplied via lines 28 and 208, respectively. The corrected exhaust-gas mass dtlrgz is conducted via a line 210 to the computation block 212 to determine the exhaust-gas return rate frg. Furthermore, the engine load Tl is supplied to the computation block 212. The exhaust-gas return rate frg results from dividing the supplied exhaust-gas mass dtlrgz by the sum of the engine load signal Tl and the exhaust-gas mass dtlrgz. The determined exhaust-gas return rate frg is conducted via a line 214 to the logic element 216. There, a base value frg0 is subtracted. This base value is supplied via the line 218 from a characteristic field 220. The engine rpm and the engine load are supplied to the characteristic field 220. The base return rate frg0 is pregiven for a specific camshaft position wnwue0 (without control) in dependence upon engine rpm and engine load. The difference dfrg between the determined return rate and the base return rate is conducted via a line 220 to characteristic line 222 which converts the change in the exhaust-gas return rate into a change of the optimal ignition angle ΔZWopt. This corrective value is added to the optimal ignition angle in the logic element 118.

The correction of the optimal ignition angle in dependence upon the internal exhaust-gas return rate results thereby from the following equation:

$$\Delta ZWopt=f(dfrg) \text{ with } dfrg=frg-frg0 \ (Nmot, Tl) \qquad (3)$$

For external exhaust-gas return, a control valve is driven by a control signal of a predetermined magnitude which leads to pregiven exhaust-gas return rate. The magnitude of the control signal tvagr is preferably a pulse-duty factor and is available to the control apparatus. To correct the torque computation and especially the optimal ignition angle, the exhaust-gas return rate frg is determined starting from the magnitude of the control signal and in dependence upon engine load and engine rpm. For this purpose, and according to FIG. 4, the control signal magnitude tvagr and the engine rpm are supplied to a first characteristic field 300. Furthermore, a further characteristic field 302 is provided which includes the relationship pregiven from the characteristic field 300 at a control magnitude 0. In a third characteristic field 304, a magnitude for the exhaust-gas return rate is stored without external exhaust-gas return as a consequence of adjusted valve overlap times in dependence upon engine rpm and engine load. The output quantities of the characteristic fields 302 and 304 are conducted via lines 306 and 308, respectively, to logic element 310. There, the two variables are multiplied with each other to form the exhaust-gas return rate frg0 without external component. This basic exhaust-gas return rate frg0 is conducted from the logic element 310 via the line 312 to the logic element 314. There, the base value frg0 is subtracted from the exhaust-gas return rate having external exhaust-gas return component frg to form the difference dfrg. The exhaust-gas return rate with external return frg is determined in the logic element 316 by multiplying the value, which is determined in characteristic field 300 and supplied via the line 318, and the value, which is determined by characteristic field 304 via the line 320. The difference value dfrg is then, via the characteristic line 322, converted into the corrective value ΔZWopt for the optimal ignition angle, which is added to the optimal ignition angle value in the logic element 118.

The ignition angle corrective value ΔZWopt for the external exhaust-gas return results therefore from the following formula:

$$\Delta ZWopt=f(dfrg) \qquad (4)$$

wherein:

dfrg=frg−frg0=[f1(Nmot,tvagr)−f1(Nmot,0)]*f2(Nmot, Tl).

Figure 5:
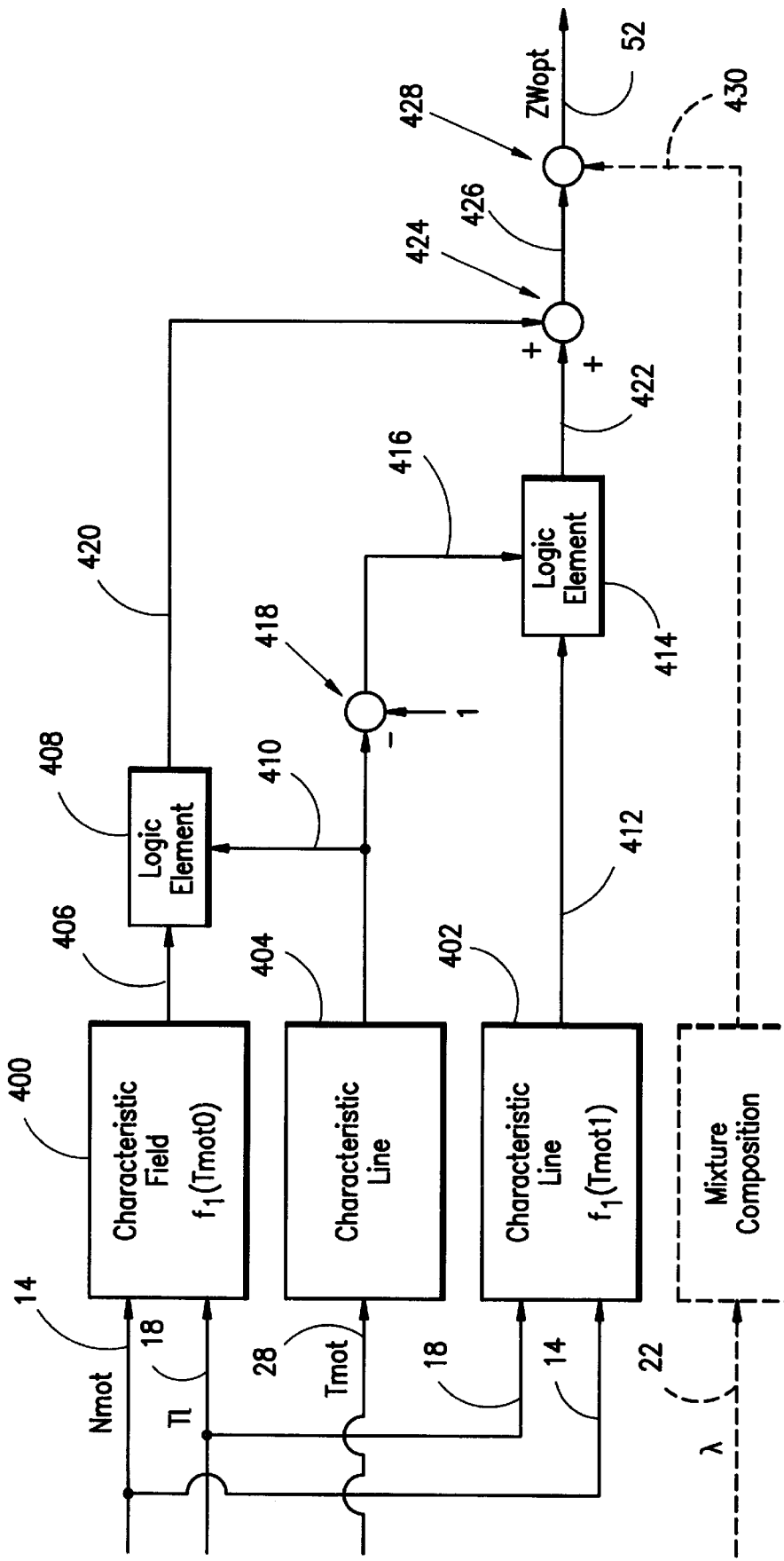
In FIG. 5, a second embodiment for considering the internal exhaust-gas return is shown; whereas, in FIG. 6, a second embodiment for considering the external exhaust-gas return for the torque computation or the conversion of the desired torque value is provided.

A second embodiment to correct the optimal ignition angle in dependence upon the internal exhaust-gas return is shown in FIG. 5. The procedure shown there is then preferably applied when the return rate is only dependent upon engine rpm, engine load and engine temperature. Then, and alternatively to the procedure of FIG. 3, the ignition angle can be computed via two ignition angle characteristic fields for two different engine temperatures Tmot0 and Tmot1. The ignition angle is weighted via an engine-temperature dependent characteristic line FZWOPM(Tmot).

The optimal ignition angle ZWopt results then from:

$$ZWopt=dZW\lambda(1/\lambda)+FZWOPM(Tmot)*f3(Nmot,Tl,Tmot0)+[1-FZ-WOPM(Tmot)]*f3(Nmot,Tl,Tmot1) \qquad (5)$$

wherein:

FZWOPM(Tmot)=1 for Tmot<Tmot0 and FZWOPM (Tmot)=0 for Tmot>Tmot1.

Correspondingly, and in accordance with FIG. 5, engine rpm and engine load are supplied to a first characteristic field 400. This characteristic field f3(Nmot,Tl,Tmot0) is applied for an engine temperature Tmot0. Furthermore, engine rpm and engine load are supplied to a second characteristic field 402 which is pregiven for an engine temperature Tmot1 (f3(Nmot,Tl,Tmot1)). The engine temperature itself is supplied to the characteristic line 404 (FZWOPM) and the output signal of the characteristic line 404 is above the engine temperature Tmot1 zero and below the temperature Tmot0 1. Therebetween, the characteristic line preferably shows a linear behavior. The engine temperature Tmot1 is greater than the engine temperature Tmot0. The quantity read out of characteristic field 400 is conducted via the line 406 to corrective element 408. There, the value is corrected with the characteristic line value which is supplied via the line 410 and is dependent upon the actual engine temperature. This takes place in accordance with the above equation via a multiplication. Correspondingly, the quantity read out of the characteristic line 402 is conducted via the line 412 to the logic element 414. A quantity is supplied to the logic element 414 via the line 416 which quantity corresponds to the characteristic line value on the line 410, which is subtracted from the number 1 in the subtraction element 418. Here too, the correction takes place in accordance with the above equation via multiplication. The output signals of the logic elements 408 and 414 are supplied via lines 420 and 422, respectively, to the logic element 424. There, the two values are added. The sum is supplied via line 426 to the addition element 428 wherein, if required, the corrective value is added in dependence upon the mixture composition via the line 430. The result defines the optimal ignition angle ZWopt which is supplied via line 52 to the other computations.

Figure 6:
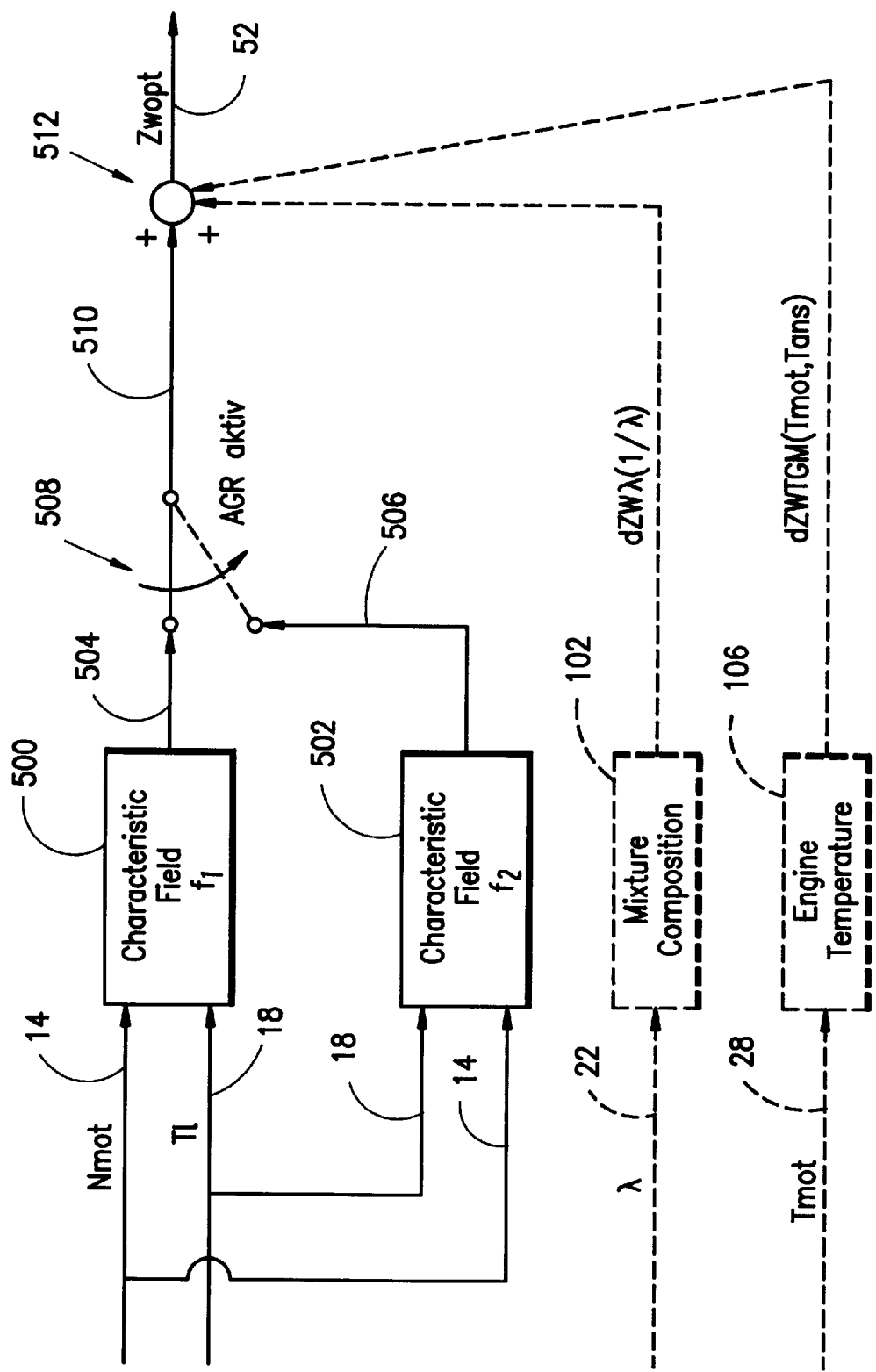

FIG. 6 shows a second embodiment for determining the optimal ignition angle for external exhaust-gas return. For active exhaust-gas return, the exhaust-gas return rate is primarily dependent upon engine rpm and engine load. In the embodiment of FIG. 6, the optimal ignition angle characteristic field is replaced by another characteristic field for active exhaust-gas return. For this purpose, a first characteristic field f1 500 and a second characteristic field f2 502 are provided in FIG. 6. Both characteristic fields are supplied with engine rpm and engine load. The characteristic field f1 is applied in such a manner that it determines the optimal ignition angle without active exhaust-gas return and the characteristic field f2 determines the optimal ignition angle for active exhaust-gas return. Correspondingly, the output lines 504 and 506 of the characteristic fields 500 and 502 are connected via a switch element 508. For a non-active exhaust-gas return, the switch element 508 connects the line 504 to the line 510; whereas, for active exhaust-gas return, the line 506 and therefore the line 502 are connected to the line 510. This line 510 leads to a logic element 512 wherein, as required, the corrective components are added in dependence upon the mixture composition and/or the corrective component is added in dependence upon the mixture temperature. The optimal ignition angle ZWopt formed thereby is supplied via the line 52 to the further computations.

The optimal ignition angle is therefore determined for non-active exhaust-gas return by the characteristic field 500 and, for active exhaust-gas return, by the characteristic field 502. In each case, the influences on the ignition angle by the activation of the exhaust-gas return are considered.

The dependency of the optimal ignition angle and therefore of the computed engine torque on the mixture composition, the engine temperature, the intake-air temperature and the exhaust-gas return must not all be considered simultaneously. Depending upon the engine and requirements, one or the other dependency is unnecessary.

In addition to the correction of the value for the optimal ignition angle, in another embodiment, the actual torque value is corrected in dependence upon at least one of the corrective quantities formed as described above. This takes place in that the difference between the corrected optimal ignition angle and the actual ignition angle (ignition angle efficiency) is converted into a torque corrective value. The characteristic line then defines the course of the efficiency of the engine in dependence upon the difference between optimal ignition angle and actual ignition angle.

I claim:

1. A method for controlling an internal combustion engine having a control unit for detecting various operating variables of the engine including engine rpm (Nmot) and engine load (TL) and for generating control variables, the engine having an optimal ignition angle (Zwopt) at which said engine operates at highest efficiency, the method comprising the steps of:

detecting the engine rpm (Nmot) and the engine load (TL);

providing a first characteristic field wherein the characteristic values thereof have been determined from an adjustment of the ignition angle for which said engine exhibits the highest efficiency thereof;

determining a value for an optimal torque (Mopt) of said engine in said first characteristic field in dependence upon said engine rpm (Nmot) and engine load (TL);

determining said optimal ignition angle (Zwopt) from a second characteristic field on the basis of said engine rpm (Nmot) and said engine load (TL);

detecting the engine temperature (Tmot) and the intake air temperature (Tans);

determining a corrective value (dZWTKM) from a third characteristic field in dependence upon said engine temperature (Tmot) and said intake air temperature (Tans);

logically coupling said optimal ignition angle (Zopt) with said corrective value (dZWTKM) to form a corrected optimal ignition angle (Zopt);

forming a deviation of the actual ignition angle adjustment (ZW) from said optimal ignition angle (Zwopt);

determining a corrective value (MZW) for the optimal torque (Mopt) in dependence upon the deviation of the optimal ignition angle (Zwopt) and the actual ignition angle setting in a characteristic line;

logically coupling said optimal torque value (Mopt) with said corrective value (MZW) to form the actual torque value (Mindact); and, processing the actual torque value to control said engine.

2. The method of claim 1, wherein the mixture composition is considered as a third operating variable of said engine.

3. The method of claim 1, wherein said operating variables include the exhaust-gas return rate.

4. The method of claim 1, wherein said operating variables include the intake-air temperature 5. The method of claim 1, wherein one of said operating variables is considered by correcting the optimal ignition angle which forms the basis of the torque computation.

6. The method of claim 1, wherein said engine has a valve overlap angle; and, wherein, for an internal return of the exhaust gas, the correction of at least one of the following:

(a) the computed torque; and, (b) the conversion of the desired torque is carried out in dependence upon the valve overlap angle.

7. The method of claim 1, wherein, for an internal return of the exhaust gas, the return rate is determined in dependence upon said engine speed, said engine load and the engine temperature; and, the torque computation is corrected in dependence upon said return rate, said computation being corrected on the basis of the given ignition angle and/or the desired torque conversion into an ignition angle being corrected in dependence upon the so determined return rate.

8. The method of claim 1, wherein, for external exhaust-gas return, two characteristic fields are provided for the optimal ignition angle; and, said characteristic fields are switched over when activating or deactivating said external exhaust-gas return.

9. The method of claim 1, wherein, for external exhaust-gas return, the correction of at least one of said torque and said conversion of said desired torque take place in dependence upon the control magnitude of the drive signal of the exhaust-gas return valve.

10. The method of claim 1, wherein the optimal ignition angle is that ignition angle at which said engine exhibits the highest efficiency.

11. An arrangement for controlling an internal combustion engine having an optimal ignition angle (Zwopt) at which said engine operates at highest efficiency, the arrangement comprising:

a control unit which detects operating variables of said engine including engine rpm (Nmot) and engine load (TL), the engine temperature (Tmot) and the intake air temperature (Tans) and which generates control variables; and, said control unit functioning to:
(a) determine a value for an optimal torque (Mopt) of said engine from a first subprogram which optimal torque (Mopt) was determined for an optimal ignition angle setting for which said engine exhibited the highest efficiency;
(b) determine an optimal ignition angle (Zwopt) on the basis of said engine rpm (Nmot) and said engine load (TL) from a second subprogram;
(c) determine a corrective value (dZWTKM) in dependence upon said engine temperature (Tmot) and said intake air temperature (Tans) with a third subprogram;
(d) couple said optimal ignition angle (Zwopt) with said corrective value (dZWTKM) to form a corrected optimal ignition angle with a fourth subprogram,
(e) determine the deviation of the actual ignition angle setting (ZW) from the optimal ignition angle (Zwopt) with a fifth subprogram;
(f) determine a corrective value (MZW) for the optimal torque in dependence upon the deviation of the optimal ignition angle and the actual ignition angle setting utilizing a sixth subprogram;
(g) correct the optimal torque value from said corrective value (MZW) to form the actual torque value (Mindact) with a seventh subprogram; and,
(h) process said actual torque value for controlling said engine with an eight subprogram.

12. The arrangement of claim 11, wherein the correction is made in dependence upon the mixture composition as a third operating variable.

* * * * *